US008125433B2

(12) United States Patent
Song et al.

(10) Patent No.: US 8,125,433 B2

(45) Date of Patent: Feb. 28, 2012

(54) LIQUID CRYSTAL DISPLAY DEVICE AND DRIVING METHOD THEREOF

(75) Inventors: Hongsung Song, Kyungbuk (KR); Woongki Min, Daegu (KR); Yonggi Son, Kyungnam (KR); Suhyuk Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 602 days.

(21) Appl. No.: 12/318,162

(22) Filed: Dec. 22, 2008

(65) Prior Publication Data

US 2010/0033413 A1 Feb. 11, 2010

(30) Foreign Application Priority Data

Aug. 8, 2008 (KR) ........................ 10-2008-0078172

(51) Int. Cl.

*G09G 3/36* (2006.01)
*G09G 5/00* (2006.01)
*G06F 3/038* (2006.01)

(52) U.S. Cl. ............ 345/95; 345/204; 345/210; 345/87; 345/98; 345/100

(58) Field of Classification Search .................. 345/204, 345/690, 208–210, 87–104

See application file for complete search history.

(56) References Cited

U.S. PATENT DOCUMENTS

| | | | | |
|---|---|---|---|---|
| 2002/0140653 | A1 * | 10/2002 | Koyama | 345/87 |
| 2007/0296657 | A1 * | 12/2007 | Ooga et al. | 345/87 |
| 2009/0184912 | A1 * | 7/2009 | Eun et al. | 345/94 |

* cited by examiner

*Primary Examiner* — Quan-Zhen Wang
*Assistant Examiner* — Ilana Spar
(74) *Attorney, Agent, or Firm* — Morgan, Lewis & Bockius LLP

(57) ABSTRACT

A liquid crystal display device and a driving method thereof are provided which can increase a display grade by removing a DC residual image. The liquid crystal display device comprises: a liquid crystal display panel for displaying gray levels by a potential difference between a common electrode for applying a common voltage and pixel electrodes for applying data voltages; a common voltage regulating circuit for generating a variable common voltage which is longitudinally symmetrical with respect to a DC common voltage of a predetermined level and whose voltage level is stepwisely varied at predetermined intervals; and a black gamma reference voltage regulating circuit for adding the variable common voltage to an offset voltage set as a gamma reference voltage of a black gray level to generate a variable gamma reference voltage varying with respect to the gamma reference voltage of the black gray level, the variable gamma reference voltage of the black gray level being varied in synchronization with the variable common voltage.

15 Claims, 6 Drawing Sheets

LIQUID CRYSTAL DISPLAY DEVICE AND DRIVING METHOD THEREOF

This application claims the benefit of Korean Patent Application No. 10-2008-0078172 filed on Aug. 8, 2008, which is incorporated herein by reference for all purposes as if fully set forth herein.

BACKGROUND OF THE INVENTION

1. Field of the Invention

This document relates to a liquid crystal display device, which can improve display grade, and a driving method thereof.

2. Related Art

A liquid crystal display device controls the light transmittance of a liquid crystal layer by an electric field applied to the liquid crystal layer in accordance with video signals to display a picture. As the liquid crystal display devices are thin and flat panel display devices having low power consumption, the liquid crystal display devices are used as displays for portable computers such as laptop computers, office automation devices, audio/video devices, and the like. Especially, an active matrix type liquid crystal display device where a switching device is formed for each liquid crystal cell is advantageous in realizing motion pictures because the switching device can be actively controlled.

The switching device used in the active matrix type liquid crystal display device is mainly a thin film transistor (hereinafter, referred to as "TFT"), as in FIG. 1.

Referring to FIG. 1, an active matrix type liquid crystal display device converts digital video data into analog data voltages on the basis of a gamma reference voltage to supply to data lines DL, and at the same time, supplies scan pulses to gate lines GL to charge liquid crystal cells Clc therewith. The TFT includes a gate electrode connected to the gate line GL, a source electrode connected to the data line DL and a drain electrode connected to a pixel electrode of the liquid crystal cell Clc and one electrode of a storage capacitor Cst1. Common voltages Vcom are supplied to a common electrode of the liquid crystal cell Clc. When the TFT is turned on, the storage capacitor Cst is charged with the data voltages applied from the data line DL, to fixedly maintain the voltage of the liquid crystal cell Clc. If the scan pulses are applied to the gate line GL, the TFT is turned on to form a channel between the source electrode and the drain electrode, thereby supplying the voltage of the data line DL to the pixel electrode of the liquid crystal cell Clc. At this moment, the liquid crystal molecules of the liquid crystal cell Clc are changed in arrangement by the electric field between the pixel electrode and the common electrode, thereby modulating the incident light.

However, when a DC voltage is applied for a long time to the liquid crystal layer of the liquid crystal display device, ions having negative charges are moved in the same motion vector direction and ions having positive charges are moved in the opposite motion vector direction in accordance with the polarity of an electric field applied to the liquid crystal, and polarized, and the accumulated amount of the ions having negative charges and the accumulated amount of the ions having positive charges are increased with time. As the accumulated amount of the ions increases, the orientation layer is deteriorated, and as a result, the orientation characteristic of the liquid crystal is deteriorated. Due to this, when a DC voltage is applied for a long time to the liquid crystal display device, a blur appears on a displayed image, and the blur becomes larger with time. To overcome this blur, a method of developing a liquid crystal material having a low dielectric constant or a method of improving an orientation material or orientation method has been attempted. However, this method requires a lot of time and cost to develop materials, and the lowering of the dielectric constant of liquid crystal may cause another problem of deterioration of the driving characteristics of the liquid crystal. According to experimentally obtained results, the more the impurities to be ionized in the liquid crystal layer, and the higher the acceleration factors, the faster the point of time of blur appearance. The acceleration factors include temperature, time, DC driving of liquid crystal, etc. Accordingly, the higher the temperature or the longer the period of time for applying a DC voltage of the same polarity to the liquid crystal layer, the faster a blur appears and the more severe the degree of the blur. Moreover, since a blur is different in shape and degree even in panels of the same model manufactured by the same manufacturing line, this cannot be solved only by developing a new material or by improving the process.

SUMMARY OF THE INVENTION

An aspect of this document is to provide a liquid crystal display device, which suppresses a blur phenomenon caused by the polarization and accumulation of ions to increase a display grade by sequentially varying the level of a common voltage applied to a liquid crystal layer at specific frame intervals and sequentially varying the level of a gamma reference voltage of a black gray level in accordance with a change in the level of the common voltage.

To achieve the above advantages, there is provided a liquid crystal display device according to an exemplary embodiment of the present invention, comprising: a liquid crystal display panel for displaying gray levels by a potential difference between a common electrode for applying a common voltage and pixel electrodes for applying data voltages; a common voltage regulating circuit for generating a variable common voltage which is longitudinally symmetrical with respect to a DC common voltage of a predetermined level and whose voltage level is stepwisely varied at predetermined intervals; and a black gamma reference voltage regulating circuit for adding the variable common voltage to an offset voltage set as a gamma reference voltage of a black gray level to generate a variable gamma reference voltage varying with respect to the gamma reference voltage of the black gray level, the variable gamma reference voltage of the black gray level being varied in synchronization with the variable common voltage.

The level of the variable common voltage is stepwisely varied during a second period, and maintained as the DC common voltage during a first period prior to the second period.

The common voltage regulating circuit comprises: a multistep common voltage generator for generating a multistep common voltage whose voltage level is stepwisely varied at the predetermined intervals; and a common voltage adder for generating the variable common voltage by selectively outputting the DC common voltage and the multistep common voltage.

The multistep common voltage generator comprises: a control clock generator for counting a number of frames by using an input timing control signal and generating a control clock every time an accumulated count value becomes a multiple of a predetermined value; a control data generator for generating control data of specific bits, whose digital value is stepwisely increased or decreased at the predetermined intervals, in synchronization with the control clock; a memory for storing a switch control signal corresponding to the control data in a lookup table; a register for reading out the switch control signal from the memory by using the control data as a read address; a decoder for decoding the read-out switch control signal and outputting the same; a resistor string for dividing a high potential power voltage and a low potential power voltage and generating a plurality of voltages whose levels are different from each other; and a switch array for connecting to a supply line for supplying the multistep common voltage to any one of a plurality of divided voltage output nodes formed in the resistor string in response to the decoded switch control signal.

The generation cycle of the control clock is determined in consideration of the polarization and accumulated amount of ions in the liquid crystal layer in accordance with the time and temperature at which a DC voltage is applied to the liquid crystal layer of the liquid crystal display panel.

The liquid crystal display device further comprises a data check signal generator, and the data check signal generator comprises: a frame memory for storing digital video data for one frame inputted from an external system board; and a data check unit for storing in advance a specific data pattern that may cause flicker, and then comparing the specific data pattern with the digital video data of the one frame and generating a data check signal at a first logic level if both are the same and at a second logic level if both are different.

The common voltage adder comprises a multiplexer for outputting the DC common voltage in response to the data check signal of the first logic level and outputting the multistep common voltage in response to the data check signal of the second logic level.

The common voltage adder comprises: a frame counter for generating count information about the number of frames by counting an input timing control signal; a selection signal generator for comparing the count information with a predetermined reference value and generating a selection signal at a first logic level if the count information is lower than the reference value and at a second logic level if the count information exceeds the reference value; and a multiplexer for outputting the DC common voltage in response to the selection signal of the first logic level and outputting the multistep common voltage in response to the selection signal of the second logic level.

The common voltage adder comprises a multiplexer for outputting the DC common voltage in response to option pin touch information set to the first logic level and outputting the multistep common voltage in response to the option pin touch information set to the second logic level.

A driving method of a liquid crystal display device having a liquid crystal display panel according to an exemplary embodiment of the present invention, which displays gray levels by a potential difference between a common electrode for applying a common voltage and pixel electrodes for applying data voltages, comprises: generating a variable common voltage which is longitudinally symmetrical with respect to a DC common voltage of a predetermined level and whose voltage level is stepwisely varied at predetermined intervals; and adding the variable common voltage to an offset voltage set as a gamma reference voltage of a black gray level to generate a variable gamma reference voltage varying with respect to the gamma reference voltage of the black gray level, the variable gamma reference voltage of the black gray level being varied in synchronization with the variable common voltage.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Hereinafter, an implementation of this document will be described in detail with reference to FIGS. 2 to 14.

Figure 1:
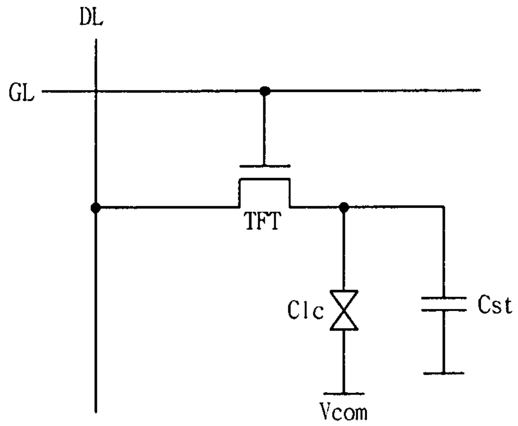
FIG. 1 (Related Art)
FIG. 1 is an equivalent circuit diagram of pixels of a general liquid crystal display device.
Figure 2:
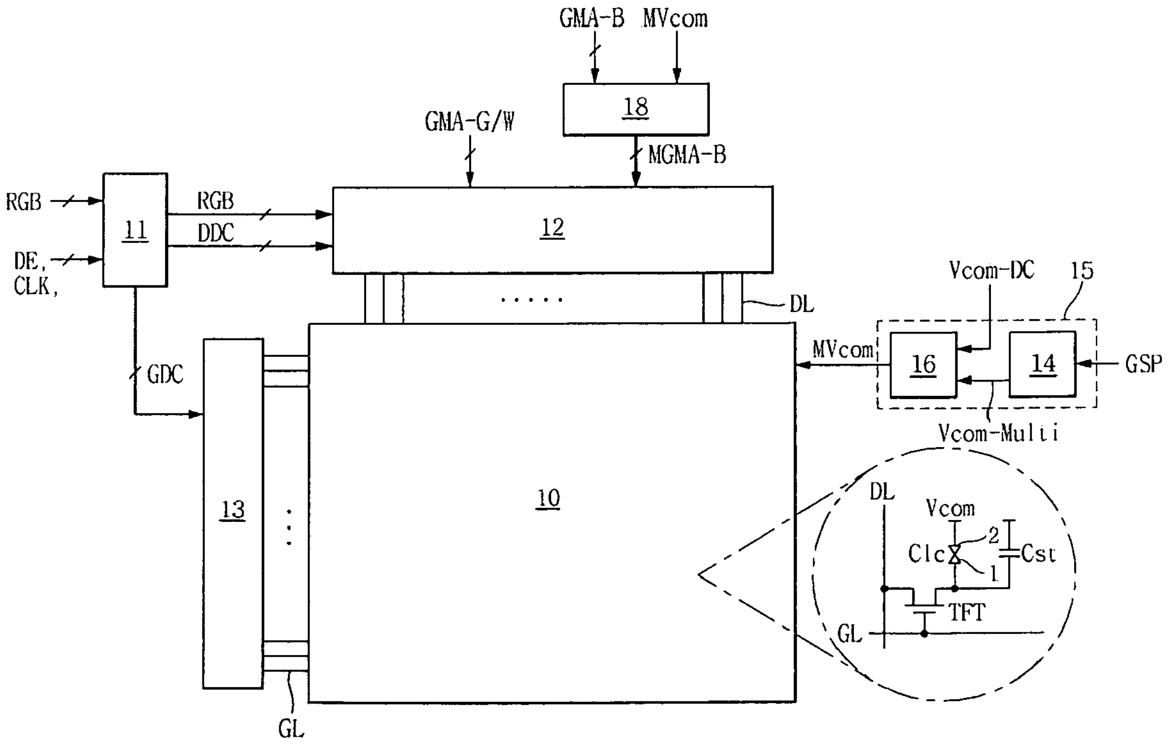
FIG. 2 is a block diagram of a liquid crystal display device according to an exemplary embodiment of the present invention.

Referring to FIG. 2, the liquid crystal display device according to an exemplary embodiment of the present invention comprises a liquid crystal panel 10, a timing controller 11, a data drive circuit 12, a gate drive circuit 13, a common voltage regulating circuit 15, and a black gamma reference voltage regulating circuit 18.

In the liquid crystal display panel 10, a liquid crystal layer is formed between two glass substrates. The liquid crystal display panel includes m x n liquid crystal cells Clc arranged in a matrix type by a structure in which m data lines DL and n gate lines Gl intersect each other.

Formed on the lower glass substrate of the liquid crystal display panel 10 are data lines DL, gate lines GL, TFTs, and storage capacitors Cst. The liquid crystal cells Clc are driven by an electric field between pixel electrodes 1 and a common electrode 2 by being connected to the TFTs. Formed on the upper glass substrate of the liquid crystal display panel 10 are a black matrix, color filters, and the common electrode 2. The common electrode 2 is formed on the upper glass substrate in devices employing a vertical electric field driving method, such as a TN (Twisted Nematic) mode or a VA (Vertical Alignment) mode. Alternatively, the common electrode 2 may be formed along with the pixel electrode 1 on the lower glass substrate in devices employing a horizontal electric field driving method, such as an IPS (In-Plane Switching) mode or an FFS (Fringe Field Switching) mode. Polarizers are respectively applied to the upper glass substrate and the lower glass substrate of the liquid crystal display panel 10. Alignment films for setting the pre-tilt angle of liquid crystal are then formed.

The timing controller 11 receives timing signals such as a data enable signal DE and a dot clock CLK signal, and generates control signals GDC and DDC for controlling the operation timing of the data drive circuit 12 and the gate drive circuit 13.

Gate timing control signals GDC for controlling the operation timing of the gate drive circuit 13 include a gate start pulse GSP which indicates a starting horizontal line from which a scan starts in a first vertical period when an image or data is displayed, a gate shift clock signal GSC which is inputted to a shift register within the gate drive circuit 13 and is generated to have a pulse width corresponding to the on-period of the TFT as a timing control signal for sequentially shifting the gate start pulse GSP, and a gate output enable signal GOE which indicates the output of the gate drive circuit 13.

Data timing control signals DDC for controlling the operation timing of the data drive circuit 12 include a source sampling clock SSC which indicates a latch operation of the data within the data drive circuit 12 on the basis of a rising or falling edge, a source output enable signal SOE which indicates the output of the data drive circuit 12, and a polarity control signal POL which indicates the polarity of the data voltage which is to be supplied to the liquid crystal cell Clc of the liquid crystal display panel 10 and the like.

Further, the timing controller 11 re-aligns digital video data RGB inputted from an external system board in accordance with the resolution of the liquid crystal display panel 10 to supply to the data drive circuit 12. The timing controller 11 supplies a gate start pulse GSP to the common voltage regulating circuit 15.

The data drive circuit 12 converts the digital video data RGB into an analog gamma compensation voltage on the basis of gamma reference voltages GMA_G/W of a gray level or white gray level which are supplied from a gamma reference voltage generator (not shown) in response to a data control signal DDC from the timing controller 11, and supplies the analog gamma compensation voltage as a data voltage of a gray level or white gray level to the data lines DL of the liquid crystal display panel 10. Further, the data drive circuit 12 converts the digital video data RGB into an analog gamma compensation voltage, whose level is sequentially varied, on the basis of variable gamma reference voltages MGMA_B of a black gray level supplied from the black gamma reference voltage regulating circuit 18 in response to a data control signal DDC from the timing controller 11, and supplies the analog gamma compensation voltage as a data voltage of a black gray level to the data lines DL of the liquid crystal display panel 10. Although described later, the variable gamma reference voltages MGMA_B of the black gray level have a different level at specific frame intervals in synchronization with a change in the level of a variable common voltage MVcom. Since the liquid crystal display device according to the present invention is inversely driven, the gamma reference voltages GMA_G/W and GMA_B of the gray level/white gray level and the black gray level, respectively, include positive and negative polarity voltages having the same level with respect to a DC common voltage Vcom_DC. While the gamma reference voltages GMA_G/W of the gray level/white gray level are directly applied to the data drive circuit 12 from the gamma reference voltage generator, the gamma reference voltages GMA_B of the black gray level outputted from the gamma reference voltage generator are applied to the data drive circuit 12 after being varied through the black gamma reference voltage regulating circuit 18.

In order to convert the digital video data RGB into an analog gamma compensation voltage, the data drive circuit 12 is configured to have a plurality of data drive ICs, each of which comprises a shift register for sampling the clock signal, a register for temporally storing the digital video data RGB, a latch for storing the data for each line in response to the clock signal from the shift register and for outputting the stored data of the one line portion at the same time, a digital/analog converter for selecting a positive/negative gamma voltage with reference to the gamma reference voltage in correspondence to the digital data value from the latch, a multiplexer for selecting the data line to which the analog data converted by the positive/negative gamma voltage are supplied, and an output buffer connected between the multiplexer and the data line DL.

The gate drive circuit 13 sequentially supplies the scan pulse, which selects the horizontal line of the liquid crystal display panel 10 to which the data voltage is supplied, to the gate lines GL. To this end, the gate drive circuit 13 is configured to have a plurality of gate drive ICs, each of which comprises a shift register, a level shifter for converting a swing width of an output signal of the shift register into a swing width which is suitable for driving the TFT of the liquid crystal cell Clc, and an output buffer connected between the level shifter and the gate line GL.

The common voltage regulating circuit 15 generates a variable common voltage MVcom which has the same level as the DC common voltage Vcom_DC during a preset initial period, and which is longitudinally symmetrical with respect to the DC common voltage Vcom_DC and swung in multisteps during a normal driving period. To this end, the common voltage regulating circuit 15 includes a multistep common voltage generator 14 and a common voltage adder 16. The multistep common voltage generator 14, as shown in FIG. 5, generates a multistep common voltage Vcom_Multi whose voltage level is stepwisely varied at predetermined time intervals. The multistep common voltage adder 16 will be described later in detail with reference to FIGS. 3 to 5. The common voltage adder 16 generates a variable common voltage MVcom by selectively outputting a DC common voltage Vcom_DC and a multistep common voltage MVcom in accordance with the logic level of control signals (any one of a data check signal CHdata, a selection signal SEL, and an option pin touch information OPT). The common voltage adder 16 will be described later in detail with reference to FIGS. 6 to 13. The variable common voltage MVcom is applied to the common electrode 2 of the liquid crystal display panel 10 and applied to the black gamma reference voltage regulating circuit 18.

Figure 14:
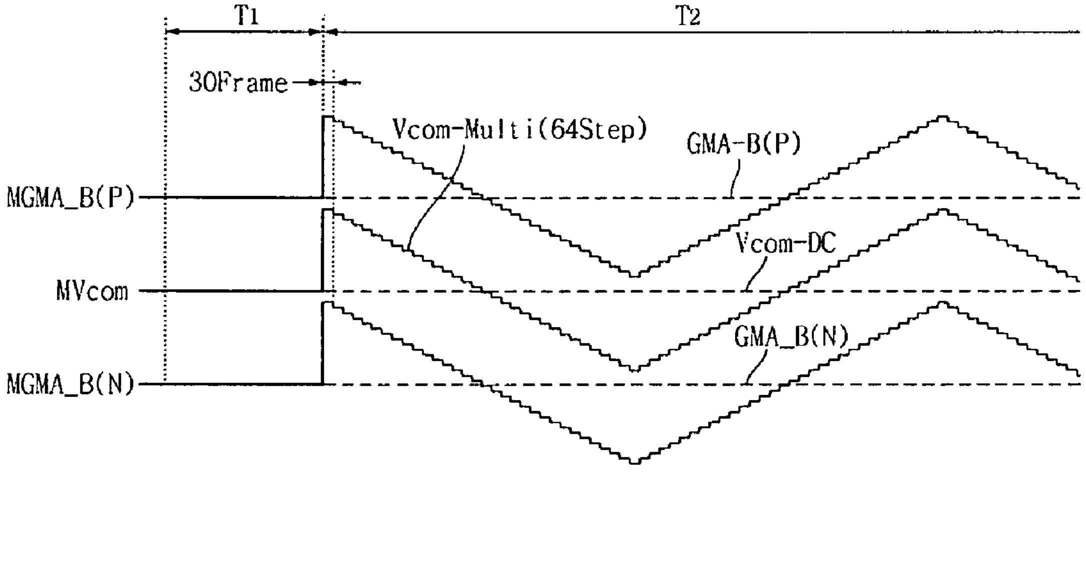
FIG. 14 shows variable gamma reference voltages MGMA_B of a black gray level generated through a black gamma reference voltage regulating circuit.

The black gamma reference voltage regulating circuit 18 generates a variable gamma reference voltage MGMA_B of a black gray level by using the gamma reference voltage GMA_B of the black gray level supplied from the gamma reference voltage generator as an offset voltage and adding the variable common voltage MVcom supplied from the common voltage regulating circuit 15 to the offset voltage. To this end, the black gamma reference voltage regulating circuit 18 comprises a voltage synthesis circuit, and this voltage synthesis circuit matches the level of the DC common voltage Vcom_DC, which is an intermediate level of the variable common voltage MVcom, with the level of the gamma reference voltage GMA_B of the black gray level to add both of them. The variable gamma reference voltage MGMA_B of the black gray level comprises, as shown in FIG. 14, a positive variable gamma reference voltage MGMA_B(P) and a negative variable gamma reference voltage MGMA_B(N). The positive variable gamma reference voltage MGMA_B(P) is generated by adding the positive gamma reference voltage GMA_B(P) of the black gray level and the variable common voltage MVcom, and the negative variable gamma reference voltage MGMA_B(N) is generated by adding the negative gamma reference voltage GMA_B(N) of the black gray level and the variable common voltage MVcom.

Figure 3:
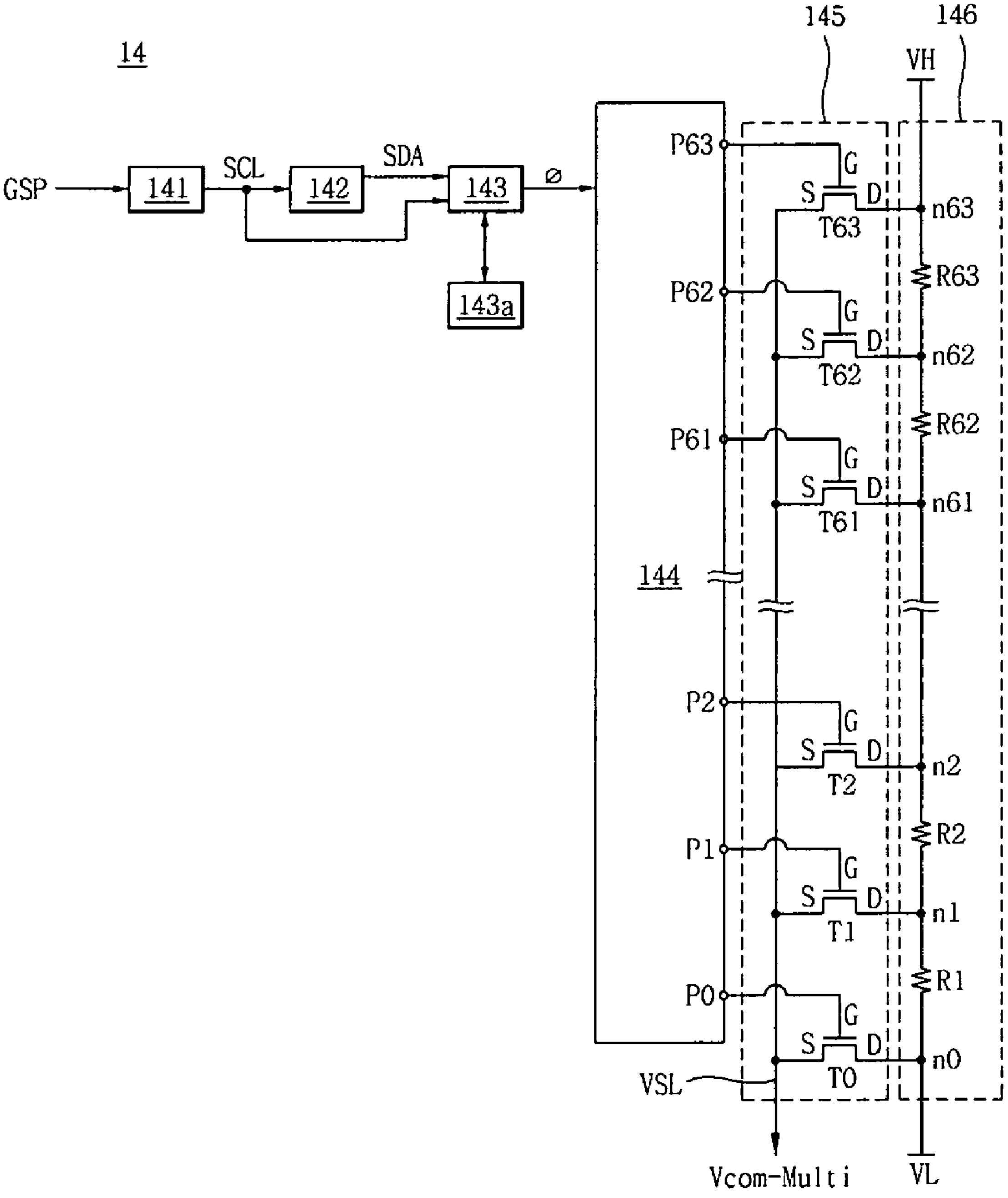
FIG. 3 shows in detail a multistep common voltage generator according to the exemplary embodiment of the present invention.

FIG. 3 shows in detail a multistep common voltage generator according to the exemplary embodiment of the present invention.

Referring to FIG. 3, the multistep common voltage generator 14 comprises a control clock generator 141, a control data generator 142, a register 143, a memory 143*a*, a decoder 144, a switch array 145, and a resistor string 146.

Figure 4:
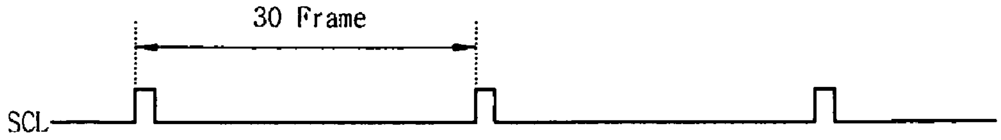
FIG. 4 is a waveform chart of a control clock according to the exemplary embodiment of the present invention.
Figure 5:
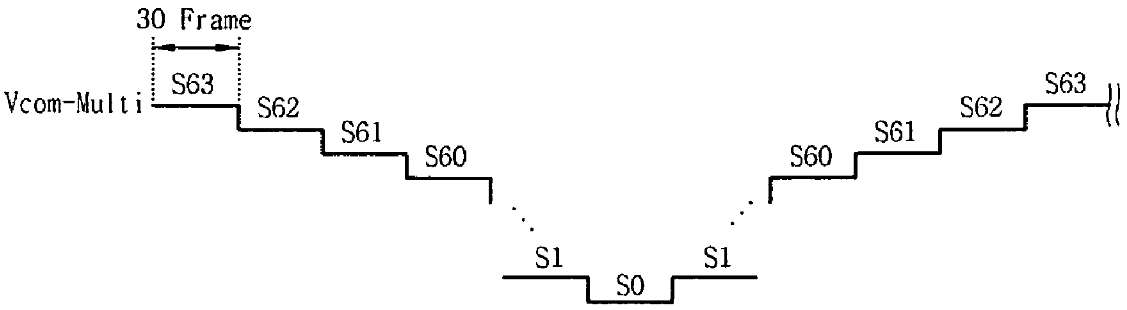
FIG. 5 is a view showing a multistep common voltage that is increased or decreased in 64 multisteps according to the exemplary embodiment of the present invention.

The control clock generator 141 comprises a frame counter for counting a number of frames in synchronization with the gate start pulse GSP supplied from the timing controller 11 and generating a control clock SCL as shown in FIG. 4 every time an accumulated count value becomes a multiple of a predetermined value (for example, 30). The control clock SCL is generated at 30 frame intervals. Here, the predetermined value of 30 is a value which indicates a point of time when a blur may appear due to the polarization and accumulation of ions as a DC voltage of the same polarity is applied to the liquid crystal layer, and the predetermined value may be set larger or lower than 30 in consideration of a temperature effect or the like. The control clock generator 141 may be incorporated in the timing controller 11 instead of the common voltage generating circuit 14.

The control data generator 142 generates control data SDA of specific bits (for example, 6 bits) in synchronization with the control clock SCL from the control clock generator 141. If the control data SDA is of 6 bits, a binary code of the control data SDA sequentially and repetitively increases and decreases between 0 to 63 levels in synchronization with the control clock SCL. To this end, the control data generator 142 may be implemented as a linear feedback shift register (LFSR). The linear feedback shift register LFSR is a shift register whose input bit is a linear function of its previous state, and can generate a pseudo-random bit sequence having a long period if a proper feedback function is selected. Meanwhile, it is natural that the control data SDA is not limited to 6 bits but may have a number of bits greater or less than that.

The memory 143*a* comprises a nonvolatile memory capable of updating and erasing data, for example, an EEPROM (Electrically Erasable Programmable Read Only Memory) and/or an EDID ROM (Extended Display Identification Data), and stores control data SDA increased or decreased in synchronization with the control clock SCL and a switch control signal Φ corresponding to the control data SDA by using a lookup table.

The register 143 reads out the switch control signal Φ stored in the memory 143*a* in accordance with the control clock SCL by using the control data SDA from the control data generator 142 as a read address, and then supplies the read-out switch control signal Φ to the decoder 144. The switch control signal Φ outputted from the register 143 may be composed of a digital signal of 6 bits.

The decoder 144 decodes the switching control signal Φ from the register 143, and outputs the decoded switch control signal Φ through an output pin corresponding to the digital value of the switch control signal Φ. The decoder 144 has 64 output pins P0 to P63 so as to correspond to the switch control signal Φ of 6 bits. The output pins P0 to P63 are respectively connected to the gate terminals G of switches T0 to T63 constituting the switch array 145.

The switch array 145 comprises a plurality of switches T0 to T63. The gate terminals G of the switches T0 to T63 are respectively connected to the output pins P0 to P63 of the decoder 144 to receive a switch control signal Φ. Drain terminals D of the switches T0 to T63 are respectively connected to divided voltage output nodes n0 to n63 formed between adjacent resistors R1 to R63 in the resistor string 146. Source terminals S of the switches T0 to T63 are commonly connected to a common voltage supply line VSL. Therefore, the switches T0 to T63 selects any one of a plurality of divided voltages as one of them is turned on in response to the switch control signal Φ from the decoder 144.

The resistor string 146 has a plurality of resistors R1 to R63 connected in series between a high potential power voltage VH and a low potential power voltage VL, and generates a plurality of divided voltages having a different level through the divided voltage output nodes n0 to n63 between the resistors. As shown in FIG. 5, these divided voltages become a multistep common voltage Vcom_Multi having 64 multisteps S0 to S63 which is sequentially increased or decreased at 30 frame intervals between 0 to 63 levels.

Figure 6:
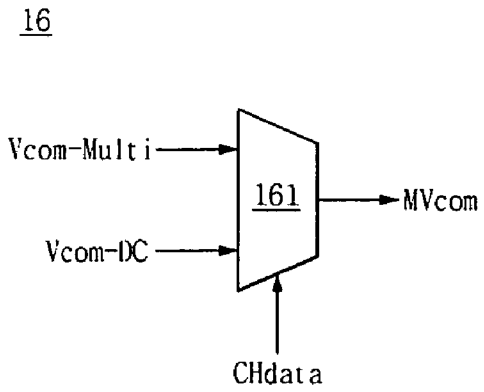
FIG. 6 is a view showing a common voltage adder according to one exemplary embodiment of the present invention.
Figure 7:
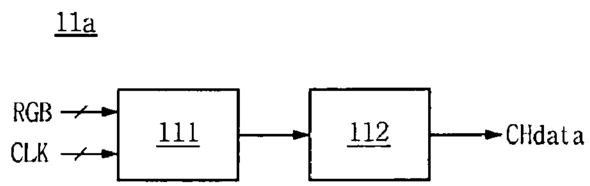
FIG. 7 is a view showing a data check signal generator.
Figure 8:
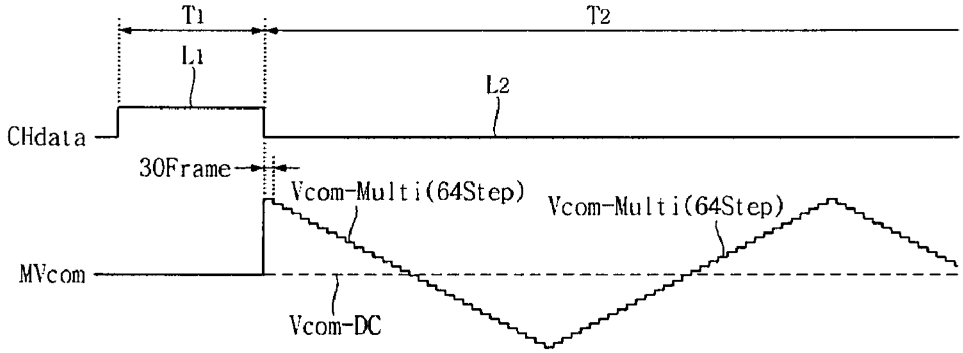
FIG. 8 is a view showing a variable common voltage according to the one exemplary embodiment of the present invention.

FIGS. 6 to 8 are views for explaining a common voltage adder 16 according to one exemplary embodiment of the present invention.

Referring to FIG. 6, the common voltage adder 16 according to the one exemplary embodiment of the present invention comprises a multiplexer 161 for selectively outputting a multistep common voltage Vcom_Multi and a DC common voltage Vcom_DC in response to a data check signal CHdata.

The data check signal CHdata is generated through a data check signal generator 11*a* as shown in FIG. 7. The data check signal generator 11*a* comprises a frame memory 111 and a data check unit 112. The frame memory 111 stores digital video data RGB for one frame inputted from an external system board and then supplies it to the data check unit 112. The data check unit 12 stores in advance a specific data pattern, such as a mosaic pattern, that may cause flicker, and then compares the specific data pattern with the digital video data of the one frame. And, as a result of comparison, as shown in FIG. 8, the data check unit 112 generates a data check signal at a first logic level L1 if both are the same and at a second logic level L2 if both are different. The data check generator 11*a* may be incorporated in the timing controller 11.

The multiplexer 161 generates a variable common voltage MVcom by selectively outputting a multistep common voltage Vcom_Multi and a DC common voltage Vcom_DC in response the data check signal CHdata from the data check signal generator 11*a*.

Accordingly, as shown in FIG. 8, the variable common voltage MVcom is generated at the level of the DC common voltage Vcom_DC during a first period T1 for generating the data check signal CHdata at the first logic level L1, and generated at the level of the multistep common voltage Vcom_Multi during a second period T2 for generating the data check signal CHdata at the second logic level L2. Here, the first period T1 is a period for supplying a specific data pattern that may easily cause flicker in order to set an optimal point of a common voltage for flicker after the completion of the assembling of a liquid crystal module, and typically means an initialization period. On the other hand, the second period T2 means a normal driving period.

Resultantly, during the initialization period T1 for setting an optimal point of a common voltage, the optimal point setting is easily and accurately done by preventing a swing of the variable common voltage MVcom. During the normal driving period T2, the polarization and accumulation of ions caused by a DC voltage of the same polarity applied to liquid crystal cells for a long time are prevented by stepwisely swinging the variable common voltage MVcom.

Figure 9:
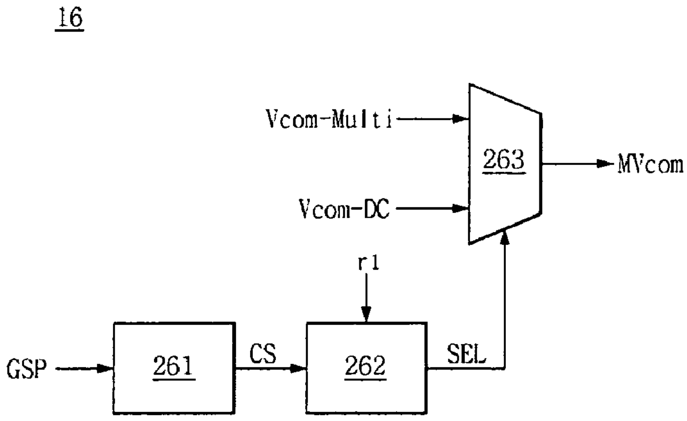
FIG. 9 is a view showing a common voltage adder according to another exemplary embodiment of the present invention.
Figure 10:
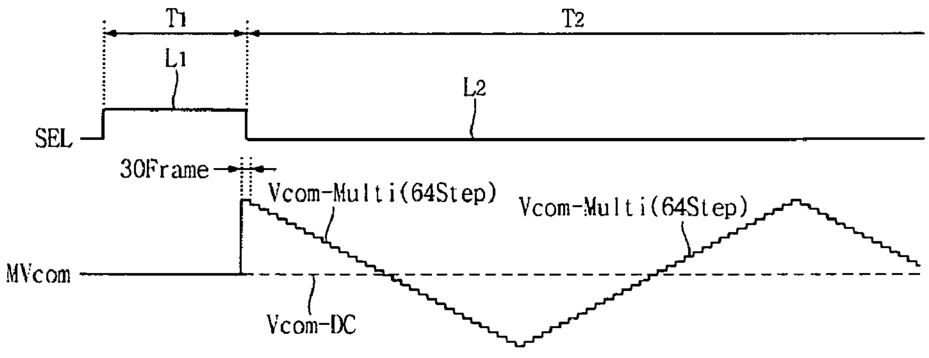
FIG. 10 is a view showing a variable common voltage according to the another exemplary embodiment of the present invention.

FIGS. 9 and 10 are views for explaining a common voltage adder 16 according to another exemplary embodiment of the present invention.

Referring to FIG. 9, the common voltage adder 16 according to the another exemplary embodiment of the present invention comprises a frame counter 261, a selection signal generator 262, and a multiplexer 263.

The frame counter 261 generates count information CS about the number of frames by counting a gate start pulse GSP generated in one vertical period interval.

The selection signal generator 262 compares the count information CS from the frame counter 261 with a predetermined reference value r1, and generates a selection signal SEL at a first logic level L1 during an initialization period until the count information CS reaches the reference value r1 and at a second logic level L2 during a normal driving period in which the count information CS exceeds the reference value r1.

The multiplexer 263 generates a variable common voltage MVcom by selectively outputting a multistep common voltage Vcom_Multi and a DC common voltage Vcom_DC in response to the selection signal SEL from the selection signal generator 262.

Accordingly, as shown in FIG. 10, the variable common voltage MVcom is generated at the level of the DC common voltage Vcom_DC during a first period T1 for generating the selection signal SEL at the first logic level L1, and generated at the level of the multistep common voltage Vcom_Multi during a second period T2 for generating the selection signal SEL at the second logic level L2. Here, the first period T1 is a period required for setting an optimal point of a common voltage for flicker after the completion of the assembling of a liquid crystal module, and typically means an initialization period. On the other hand, the second period T2 means a normal driving period.

Resultantly, during the initialization period T1 for setting an optimal point of a common voltage, the optimal point setting is easily and accurately done by preventing a swing of the variable common voltage MVcom. During the normal driving period T2, the polarization and accumulation of ions caused by a DC voltage of the same polarity applied to liquid crystal cells for a long time are prevented by stepwisely swinging the variable common voltage MVcom.

Figure 11:
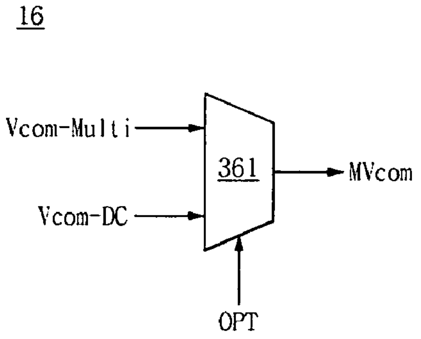
FIG. 11 is a view showing a common voltage adder according to still another exemplary embodiment of the present invention.
Figure 12:
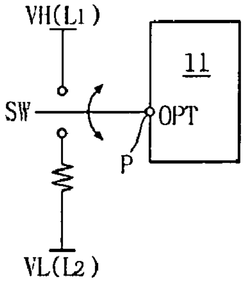
FIG. 12 is a view showing an option pin connected to a timing controller.

FIGS. 11 and 12 are views for explaining a common voltage adder 16 according to still another exemplary embodiment of the present invention.

Referring to FIG. 11, the common voltage adder 16 according to the still another exemplary embodiment of the present invention comprises a multiplexer 361 for selectively outputting a multistep common voltage Vcom_Multi and a DC common voltage Vcom_DC in response to option pin touch information OPT.

The option pin touch information OPT is generated at a first logic level L1 if an option pin P connected to the timing controller 11 is connected to a high potential voltage source VH by changing over the switch SW by the user and at a second logic level if the option pin P is connected to a low potential voltage source VL. The user typically connects the option pin P to the high potential voltage source VH during the initialization period and connects the option pin P to the low potential voltage source VL during the normal driving period.

The multiplexer 361 generates a variable common voltage MVcom by selectively outputting a multistep common voltage Vcom_Multi and a DC common voltage Vcom_DC in response to the option pin touch information OPT.

Figure 13:
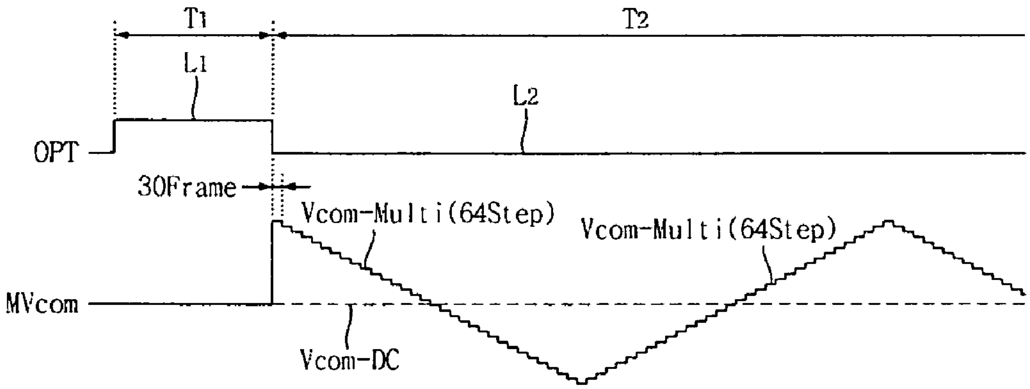
FIG. 13 is a view showing a variable common voltage according to the still another exemplary embodiment of the present invention.

Accordingly, as shown in FIG. 13, the variable common voltage MVcom is generated at the level of the DC common voltage Vcom_DC during a first period T1 for generating the option pin touch information OPT at the first logic level L1, and generated at the level of the multistep common voltage Vcom_Multi during a second period T2 for generating the option pin touch information OPT at the second logic level L2. Here, the first period T1 is a period required for setting an optimal point of a common voltage for flicker after the completion of the assembling of a liquid crystal module, and typically means an initialization period. On the other hand, the second period T2 means a normal driving period.

Resultantly, during the initialization period T1 for setting an optimal point of a common voltage, the optimal point setting is easily and accurately done by preventing a swing of the variable common voltage MVcom. During the normal driving period T2, the polarization and accumulation of ions caused by a DC voltage of the same polarity applied to liquid crystal cells for a long time are prevented by stepwisely swinging the variable common voltage MVcom.

FIG. 14 shows variable gamma reference voltages MGMA_B of a black gray level generated through a black gamma reference voltage regulating circuit 18.

Referring to FIG. 14, the variable gamma reference voltages MGMA_B of the black gray level include a positive polarity variable gamma reference voltage MGMA_B(P) and a negative polarity variable gamma reference voltage MGMA_B(N). In accordance with a variable common voltage MVcom added to a positive polarity black gamma reference voltage GMA_B(P), the positive polarity variable gamma reference voltage MGMA_B(P) is maintained at the positive polarity black gamma reference voltage GMA_B(P) during the first period T1, while its level is sequentially varied at the same swing cycle and step change width synchronized with the swing cycle and step change width of the variable common voltage MVcom during the second period T2. Further, in accordance with a variable common voltage MVcom added to a negative polarity black gamma reference voltage GMA_B(N), the negative polarity variable gamma reference voltage MGMA_B(P) is maintained at the negative polarity black gamma reference voltage GMA_B(N) during the first period T1, while its level is sequentially varied at the same swing cycle and step change width synchronized with the swing cycle and step change width of the variable common voltage MVcom during the second period T2. The level of the variable gamma reference voltages MGMA_B of the black gray level are varied in synchronization with the swing cycle and step change width of the variable common voltage MVcom in order to eliminate a black luminance difference between a positive polarity black voltage and negative polarity black voltage of the liquid crystal cells caused by the swing operation of the variable common voltage MVcom. If the variable gamma reference voltages MGMA_B of the black gray level are continuously maintained at the same level in correspondence to the variable common voltage MVcom that is sequentially swung up and down with respect to the level of the DC common voltage Vcom_DC, it is inevitable that a black luminance difference is generated between the positive polarity black voltage and negative polarity black voltage applied to the liquid crystal cells. For instance, while the positive polarity black voltage applied to the liquid crystal cells shows a lower luminance than the negative polarity black voltage during a period in which the level of the variable common voltage MVcom is kept higher than that of the DC common voltage Vcom_DC, the positive polarity black voltage applied to the liquid crystal cells shows a higher luminance than the negative polarity black voltage during a period in which the level of the variable common voltage MVcom is kept lower than that of the DC common voltage Vcom_DC. The black luminance difference between the positive polarity black voltage and negative polarity black voltage causes the contrast ratio to be reduced significantly, and this side effect is solved by varying the level of the variable gamma reference voltages MGMA_B of the black gray level in synchronization with the swing cycle and step change width of the variable common voltage MVcom. Meanwhile, the variation of the level of the variable gamma reference voltages MGMA_B of the black gray level is much more effective in the normally black mode in which the greater the data voltage applied to the liquid crystal cells, the higher the transmittance or output gray level, than in the normally white mode in which the greater the data voltage applied to the liquid crystal cells, the lower the transmittance or output gray level. In the normally white mode, if the level of the gamma reference voltages of the black gray level is varied, the levels of the gamma reference voltages of a gray level or white gray level as well are greatly varied, while in the normally black mode, eve if the level of the gamma reference voltages of the black gray level is varied, this does not have much effect on the levels of the gamma reference voltages of the gray level or white gray level.

As described above, the liquid crystal display device and driving method thereof according to the present invention can disperse the orientation and intensity of an electric field vector formed on the liquid crystal layer by sequentially varying the level of a common voltage applied to the liquid crystal layer at predetermined time intervals, and accordingly can greatly increase a display grade by suppressing a blur phenomenon caused by the polarization and accumulation of ions.

Furthermore, the liquid crystal display device and driving method thereof according to the present invention can easily and accurately achieve an optimal point setting by preventing a swing of the common voltage upon setting an optimal point of a common voltage for flicker, while dispersing the orientation and intensity of an electric field vector formed on the liquid crystal layer by sequentially varying the level of a common voltage applied to the liquid crystal layer at predetermined time intervals.

Furthermore, the liquid crystal display device and driving method thereof according to the present invention can eliminate a black luminance difference between a positive polarity black voltage and negative polarity black voltage of liquid crystal cells caused by the swing operation of the common voltage by varying the level of the gamma reference voltages of the black gray level in synchronization with the swing cycle and step change width of the common voltage.

As described above, it will be appreciated by those skilled in the art that various changes and modifications might be made without departing from the technical idea of the invention. Accordingly, the technical scope of this invention is not restricted by the description of the specification but defined by the claims.

What is claimed is:

1. A liquid crystal display device, comprising:

a liquid crystal display panel for displaying gray levels by a potential difference between a common electrode for applying a variable common voltage and pixel electrodes for applying data voltages;

a common voltage regulating circuit for generating the variable common voltage which is longitudinally symmetrical with respect to a DC common voltage of a predetermined level and whose voltage level is stepwisely varied at predetermined intervals;

a black gamma reference voltage regulating circuit for adding the variable common voltage to an offset voltage set as a gamma reference voltage of a black gray level to generate a variable gamma reference voltage varying with respect to the gamma reference voltage of the black gray level; and a data drive circuit for converting a digital video data into a gamma compensation voltage, whose level is sequentially varied, on the basis of the variable gamma reference voltage supplied from the black gamma reference voltage regulating circuit, and for supplying the gamma compensation voltage as the data voltage of a black gray level to data lines of the liquid crystal display panel, wherein the variable gamma reference voltage is varied in synchronization with the variable common voltage.

2. The liquid crystal display panel of claim 1, wherein the level of the variable common voltage is stepwisely varied during a second period, and maintained as the DC common voltage during a first period prior to the second period.

3. The liquid crystal display panel of claim 2, wherein the common voltage regulating circuit comprises:

a multistep common voltage generator for generating a multistep common voltage whose voltage level is stepwisely varied at the predetermined intervals; and a common voltage adder for generating the variable common voltage by selectively outputting the DC common voltage and the multistep common voltage.

4. The liquid crystal display device of claim 3, wherein the multistep common voltage generator comprises:

a control clock generator for counting a number of frames by using an input timing control signal and generating a control clock every time an accumulated count value becomes a multiple of a predetermined value;

a control data generator for generating control data of specific bits, whose digital value is stepwisely increased or decreased at the predetermined intervals, in synchronization with the control clock;

a memory for storing a switch control signal corresponding to the control data in a lookup table;

a register for reading out the switch control signal from the memory by using the control data as a read address;

a decoder for decoding the read-out switch control signal and outputting the same;

a resistor string for dividing a high potential power voltage and a low potential power voltage and generating a plurality of voltages whose levels are different from each other; and a switch array for connecting to a supply line for supplying the multistep common voltage to any one of a plurality of divided voltage output nodes formed in the resistor string in response to the decoded switch control signal.

5. The liquid crystal display device of claim 4, wherein the generation cycle of the control clock is determined in consideration of the polarization and accumulated amount of ions in the liquid crystal layer in accordance with the time and temperature at which a DC voltage is applied to the liquid crystal layer of the liquid crystal display panel.

6. The liquid crystal display device of claim 3, wherein the liquid crystal display device further comprises a data check signal generator, and the data check signal generator comprises:

a frame memory for storing digital video data for one frame inputted from an external system board; and a data check unit for storing in advance a specific data pattern that may cause flicker, and then comparing the specific data pattern with the digital video data of the one frame and generating a data check signal at a first logic level if both are the same and at a second logic level if both are different.

7. The liquid crystal display device of claim 6, wherein the common voltage adder comprises a multiplexer for outputting the DC common voltage in response to the data check signal of the first logic level and outputting the multistep common voltage in response to the data check signal of the second logic level.

8. The liquid crystal display device of claim 3, wherein the common voltage adder comprises:

a frame counter for generating count information about the number of frames by counting an input timing control signal;

a selection signal generator for comparing the count information with a predetermined reference value and generating a selection signal at a first logic level if the count information is lower than the reference value and at a second logic level if the count information exceeds the reference value; and a multiplexer for outputting the DC common voltage in response to the selection signal of the first logic level and outputting the multistep common voltage in response to the selection signal of the second logic level.

9. The liquid crystal display device of claim 3, wherein the common voltage adder comprises a multiplexer for outputting the DC common voltage in response to option pin touch information set to the first logic level and outputting the multistep common voltage in response to the option pin touch information set to the second logic level.

10. A driving method of a liquid crystal display device having a liquid crystal display panel, which displays gray levels by a potential difference between a common electrode for applying a variable common voltage and pixel electrodes for applying data voltages, comprising:

generating the variable common voltage which is longitudinally symmetrical with respect to a DC common voltage of a predetermined level and whose voltage level is stepwisely varied at predetermined intervals;

adding the variable common voltage to an offset voltage set as a gamma reference voltage of a black gray level to generate a variable gamma reference voltage varying with respect to the gamma reference voltage of the black gray level; and converting a digital video data into a gamma compensation voltage, whose level is sequentially varied, on the basis of the variable gamma reference voltage, and supplying the gamma compensation voltage as the data voltage of a black gray level to data lines of the liquid crystal display panel, wherein the variable gamma reference voltage is varied in synchronization with the variable common voltage.

11. The method of claim 10, wherein the generating of the variable common voltage comprises:

generating a multistep common voltage whose voltage level is stepwisely varied at predetermined time intervals; and selectively outputting the DC common voltage and the multistep common voltage.

12. The method of claim 11, wherein the generating of the multistep common voltage comprises:

counting a number of frames by using an input timing control signal and generating a control clock every time an accumulated count value becomes a multiple of a predetermined value;

generating control data of specific bits, whose digital value is stepwisely increased or decreased at the predetermined intervals, in synchronization with the control clock;

storing a switch control signal corresponding to the control data and then reading out the switch control signal from the memory by using the control data as a read address;

decoding the read-out switch control signal and outputting the same; and connecting any one of a plurality of divided voltage output nodes to the multistep common voltage, the plurality of divided voltage output nodes being formed in a resistor string for dividing a high potential power voltage and a low potential power voltage and generating a plurality of voltages whose levels are different from each other.

13. The method of claim 11, wherein the selective outputting of the DC common voltage and the multistep common voltage comprises:

storing digital video data for one frame inputted from an external system board;

storing in advance a specific data pattern that may cause flicker, and then comparing the specific data pattern with the digital video data of the one frame and generating a data check signal at a first logic level if both are the same and at a second logic level if both are different; and outputting the DC common voltage in response to the data check signal of the first logic level and outputting the multistep common voltage in response to the data check signal of the second logic level.

14. The method of claim 11, wherein the selective outputting of the DC common voltage and the multistep common voltage comprises:

generating count information about the number of frames by counting an input timing control signal;

comparing the count information with a predetermined reference value and generating a selection signal at a first logic level if the count information is lower than the reference value and at a second logic level if the count information exceeds the reference value; and outputting the DC common voltage in response to the selection signal of the first logic level and outputting the multistep common voltage in response to the selection signal of the second logic level.

15. The method of claim 11, wherein, in the selective outputting of the DC common voltage and the multistep common voltage, the DC common voltage is outputted in response to option pin touch information set to the first logic level and the multistep common voltage is outputted in response to the option pin touch information set to the second logic level.

* * * * *